(12) United States Patent
Henry et al.

(10) Patent No.: US 12,744,839 B2
(45) Date of Patent: Sep. 22, 2026

(54) HEADERS FOR BACKSCATTERING DEVICES

(71) Applicant: Cisco Technology, Inc., San Jose, CA (US)

(72) Inventors: Jerome Henry, Pittsboro, NC (US); Pascal Thubert, Roquefort les Pins (FR); Jean-Philippe Vasseur, Saint Martin D'uriage (FR); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 269 days.

(21) Appl. No.: 18/603,879

(22) Filed: Mar. 13, 2024

(65) Prior Publication Data

US 2024/0380828 A1 Nov. 14, 2024

Related U.S. Application Data

(60) Provisional application No. 63/501,652, filed on May 11, 2023.

(51) Int. Cl.
*H04L 69/22* (2022.01)
*H04L 61/5007* (2022.01)

(52) U.S. Cl.
CPC .......... *H04L 69/22* (2013.01); *H04L 61/5007* (2022.05)

(58) Field of Classification Search
CPC ........................... H04L 69/22; H04L 61/5007; H04L 2101/622
See application file for complete search history.

(56) References Cited

U.S. PATENT DOCUMENTS

| | | | | |
|---|---|---|---|---|
| 11,483,766 | B1 * | 10/2022 | Shukla | H04W 48/20 |
| 2013/0117586 | A1 * | 5/2013 | Li | H04L 12/12 713/310 |
| 2014/0369365 | A1 | 12/2014 | Denio et al. | |
| 2016/0077573 | A1 * | 3/2016 | Lee | H04L 12/12 713/310 |
| 2017/0257795 | A1 | 9/2017 | Stacey | |
| 2019/0349857 | A1 * | 11/2019 | Kim | H04W 80/02 |
| 2020/0212956 | A1 | 7/2020 | Gollakota et al. | |
| 2021/0368439 | A1 * | 11/2021 | Karimaruthumkal | H04L 5/0055 |
| 2023/0140866 | A1 | 5/2023 | Sharma et al. | |
| 2023/0362723 | A1 * | 11/2023 | Qiao | H04L 69/04 |

(Continued)

OTHER PUBLICATIONS

International Search Report and Written Opinion for International Application No. PCT/US2024/027087, mailed Sep. 10, 2024, 13 Pages.

*Primary Examiner* — Johnny B Aguiar
(74) *Attorney, Agent, or Firm* — Patterson + Sheridan, LLP

(57) ABSTRACT

The present disclosure describes an apparatus that generates headers for backscattering devices. The apparatus includes one or more memories and one or more processors communicatively coupled to the one or more memories. A combination of the one or more processors determined an Internet protocol (IP) address for a backscattering device, generates a header that includes the IP address, and communicates a first energizing frame to the backscattering device. The first energizing frame includes the header. The combination of the one or more processors also receives a message from the backscattering device. The message includes the header.

14 Claims, 9 Drawing Sheets

(56) References Cited

U.S. PATENT DOCUMENTS

| | | | | |
|---|---|---|---|---|
| 2023/0379901 | A1 | 11/2023 | Wang et al. | |
| 2024/0255634 | A1* | 8/2024 | Wang | G01S 13/75 |
| 2024/0259090 | A1* | 8/2024 | Wang | H04B 7/22 |
| 2025/0038842 | A1* | 1/2025 | He | H04B 5/77 |

* cited by examiner

308
Payload
402
Compressed Headers
306

HEADERS FOR BACKSCATTERING DEVICES

CROSS-REFERENCE TO RELATED APPLICATIONS

This application claims benefit of U.S. provisional patent application Ser. No. 63/501,652 filed May 11, 2023. The aforementioned related patent application is herein incorporated by reference in its entirety.

TECHNICAL FIELD

Embodiments presented in this disclosure generally relate to backscattering devices. More specifically, embodiments disclosed herein relate to header generation for backscattering devices.

BACKGROUND

Backscattering devices use energy in wireless signals in the environment to power the functions and operations of the backscattering devices. Backscattering devices tend to be severely energy constrained. Each byte of data that the backscattering devices generate and transmit draws from a limited energy supply. Thus, it may be impractical for some backscattering devices to transmit full size legacy frames (e.g., wireless fidelity (WiFi) frames).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
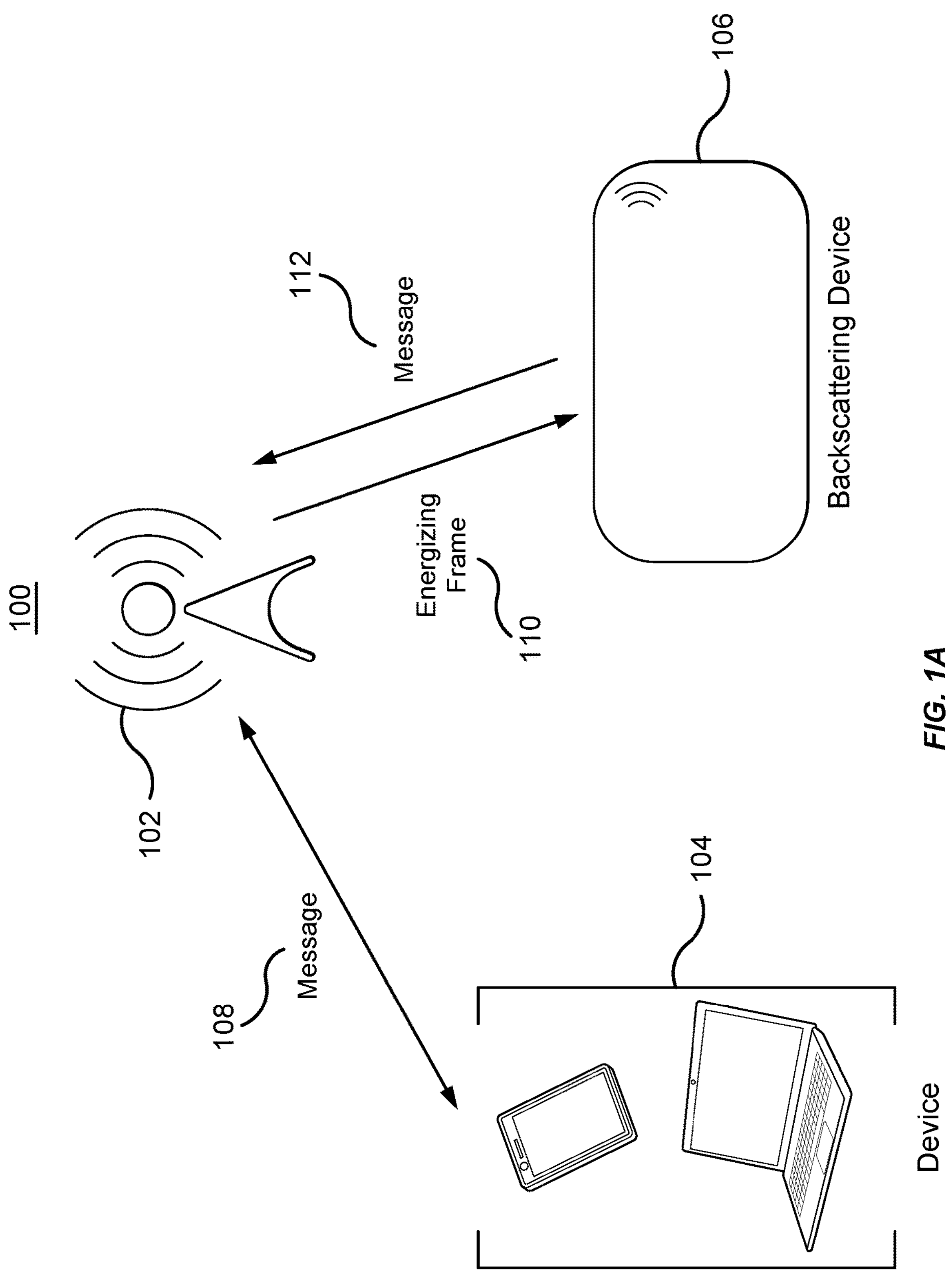
FIGS. 1A and 1B illustrate an example system.

The present disclosure describes an apparatus that generates headers for backscattering devices. According to an embodiment, an apparatus includes one or more memories and one or more processors communicatively coupled to the one or more memories. A combination of the one or more processors determined an Internet protocol (IP) address for a backscattering device, generates a header that includes the IP address, and communicates a first energizing frame to the backscattering device. The first energizing frame includes the header. The combination of the one or more processors also receives a message from the backscattering device. The message includes the header.

According to another embodiment, a method includes determining, by an access point, an IP address for a backscattering device and generating, by the access point, a header that includes the IP address. The method also includes communicating, by the access point, a first energizing frame to the backscattering device. The first energizing frame includes the header. The method further includes receiving, by the access point, a message from the backscattering device. The message includes the header.

According to another embodiment, a non-transitory computer readable medium stores instructions that, when executed by a combination of one or more processors, cause the combination of one or more processors to determine an IP header that a backscattering device would use to communicate messages and generate the IP header. The combination of the one or more processors also communicates a first energizing frame to the backscattering device. The first energizing frame includes the IP header. The combination of the one or more processors further receives a message from the backscattering device. The message includes the IP header.

EXAMPLE EMBODIMENTS

The present disclosure describes a network (e.g., a WiFi network) that generates headers for backscattering devices to use when the backscattering devices generate messages. An access point (or network controller) may determine header information (e.g., IP address, media access control (MAC) address, destination IP address, etc.) for a backscattering device (e.g., during registration). The access point then generates a header using this information and includes the header in an energizing frame to the backscattering device. When the backscattering device receives the energizing frame, the backscattering device stores the header from the access point. When the backscattering device forms and communicates a message, the backscattering device uses the header from the access point as the header or part of the header of the message.

In certain embodiments, the network provides several technical advantages. For example, by generating the header for the backscattering device to use, the network avoids having the backscattering device generate the header, which conserves the backscattering device's energy. As another example, the network may avoid having the backscattering device perform a dynamic host configuration protocol (DHCP) process to receive an IP address, which further conserves the backscattering device's energy.

FIG. 1A illustrates an example system 100, which may be a wireless network (e.g., a WiFi network). As seen in FIG. 1A, the system 100 includes one or more access points 102, one or more devices 104, and one or more backscattering devices 106. Generally, the devices 104 and backscattering devices 106 connect to an access point 102. The access point 102 provides network coverage for the system 100. The access point 102 communicates messages to the devices 104 and backscattering devices 106 and directs messages from the devices 104 and backscattering devices 106 towards their destination.

The access point 102 facilitates wireless communication (e.g., WiFi communication) in the system 100. One or more devices 104 or backscattering devices 106 may connect to the access point 102. The access point 102 may then facilitate wireless communication for the connected devices 104 and backscattering devices 106. For example, the access point 102 may transmit messages to a connected device 104 or backscattering device 106. As another example, the access point 102 may receive messages transmitted by the device 104 or backscattering device 106. The access point 102 may then direct that message towards its intended destination.

The device 104 may be any suitable device that wirelessly connects to the access point 102. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user. The device 104 may include a hardware processor, memory, or circuitry configured to perform any of the functions or actions of the device 104 described herein. For example, a software application designed using software code may be stored in the memory and executed by the processor to perform the functions of the device 104.

The backscattering device 106 (which may also be referred to and function as an ambient power station or ambient power device) may be a device that relies on electrical energy in signals transmitted by the access point 102 to power the operations of the backscattering device 106. For example, the backscattering device 106 may receive wireless signals in the system 100 (e.g., signals transmitted by the access point 102). The backscattering device 106 then uses the energy in the signals to modify the signals with encoded data and to reflect the modified signals. The access point 102, device 104, and/or other backscattering devices 106 may then receive or detect the reflected signals with the encoded data. As another example, the backscattering device 106 may harvest and store energy (e.g., in a capacitor) from the signals transmitted by the access point 102. The backscattering device 106 may then use that energy to form and transmit messages or to perform other functions of the backscattering device 106.

As seen in FIG. 1A, the access point 102 transmits messages 108 to the device 104, and vice versa. The access point also transmits an energizing frame 110 to the backscattering device 106. The backscattering device 106 may use the energy in the energizing frame 110 to form and transmit a message 112. The backscattering device 106 then sends the message 112 to the access point 102. Because the backscattering device 106 relies on electrical energy in the energizing frame 110 to operate, the backscattering device 106 tends to be energy constrained. Each byte of data that the backscattering device 106 generates and transmits consumes from a limited energy supply.

To assist the backscattering device 106, the access point 102 may generate headers or portions of headers (e.g., IP headers) for the message 112. For example, the access point 102 may determine information such as an IP address for the backscattering device 106, an IP address for a destination of the backscattering device 106, a MAC address of the backscattering device 106, etc. The access point 102 then generates a header that incorporates this information. The access point 102 then communicates the header to the backscattering device 106 in the energizing frame 110. The backscattering device 106 may then store and use the header when forming the message 112. In this manner, the backscattering device 106 avoids having to generate the header, which conserves energy in the backscattering device 106.

In some embodiments, the device 104 generates headers for the backscattering device 106. The device 104 transmits energizing frames that include the headers to the backscattering device 106. The backscattering device 106 may then store and use the headers from the device 104 to generate messages. In this manner, the device 104 performs some of the functions or features of the access point 102.

Figure 1B:
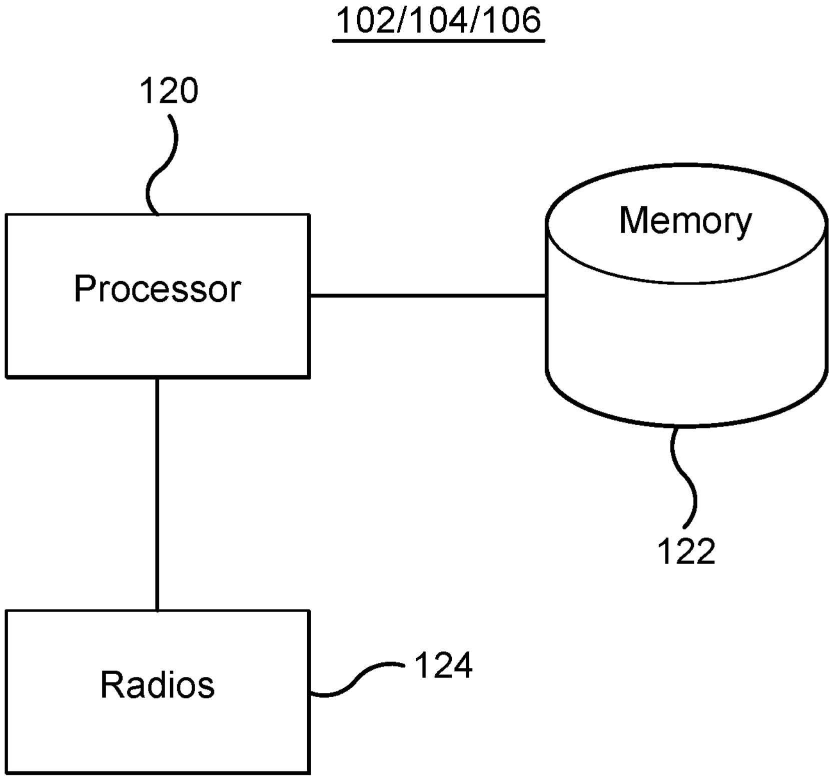

FIG. 1B illustrates an example access point 102, device 104, or backscattering device 106 in the system 100 of FIG. 1A. As seen in FIG. 1B, the access point 102, device 104, or backscattering device 106 includes a processor 120, a memory 122, and one or more radios 124.

The processor 120 is any electronic circuitry, including, but not limited to one or a combination of microprocessors, microcontrollers, application specific integrated circuits (ASIC), application specific instruction set processor (ASIP), and/or state machines, that communicatively couples to the memory 122 and controls the operation of the access point 102, device 104, and/or backscattering device 106. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on the memory 122 to perform any of the functions described herein. The processor 120 controls the operation and administration of the access point 102, device 104, and/or backscattering device 106 by processing information (e.g., information received from the memory 122 and radios 124). The processor 120 is not limited to a single processing device and may encompass multiple processing devices contained in the same device or computer or distributed across multiple devices or computers. The processor 120 is considered to perform a set of functions or actions if the multiple processing devices collectively perform the set of functions or actions, even if different processing devices perform different functions or actions in the set.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a compact disc (CD), or a flash drive. In particular embodiments, the software may include an application executable by the processor 120 to perform one or more of the functions described herein. The memory 122 is not limited to a single memory and may encompass multiple memories contained in the same device or computer or distributed across multiple devices or computers. The memory 122 is considered to store a set of data, operational software, or information if the multiple memories collectively store the set of data, operational software, or information, even if different memories store different portions of the data, operational software, or information in the set.

The radios 124 may communicate messages or information using different communication technologies. For example, the access point 102, device 104, and/or backscattering device 106 may use one or more of the radios 124 for WiFi communications. The access point 102, device 104, and/or backscattering device 106 may use one or more of the radios 124 to transmit messages and one or more of the radios 124 to receive messages. The access point 102, device 104, and/or backscattering device 106 may include any number of radios 124 to communicate using any number of communication technologies.

Figure 2:
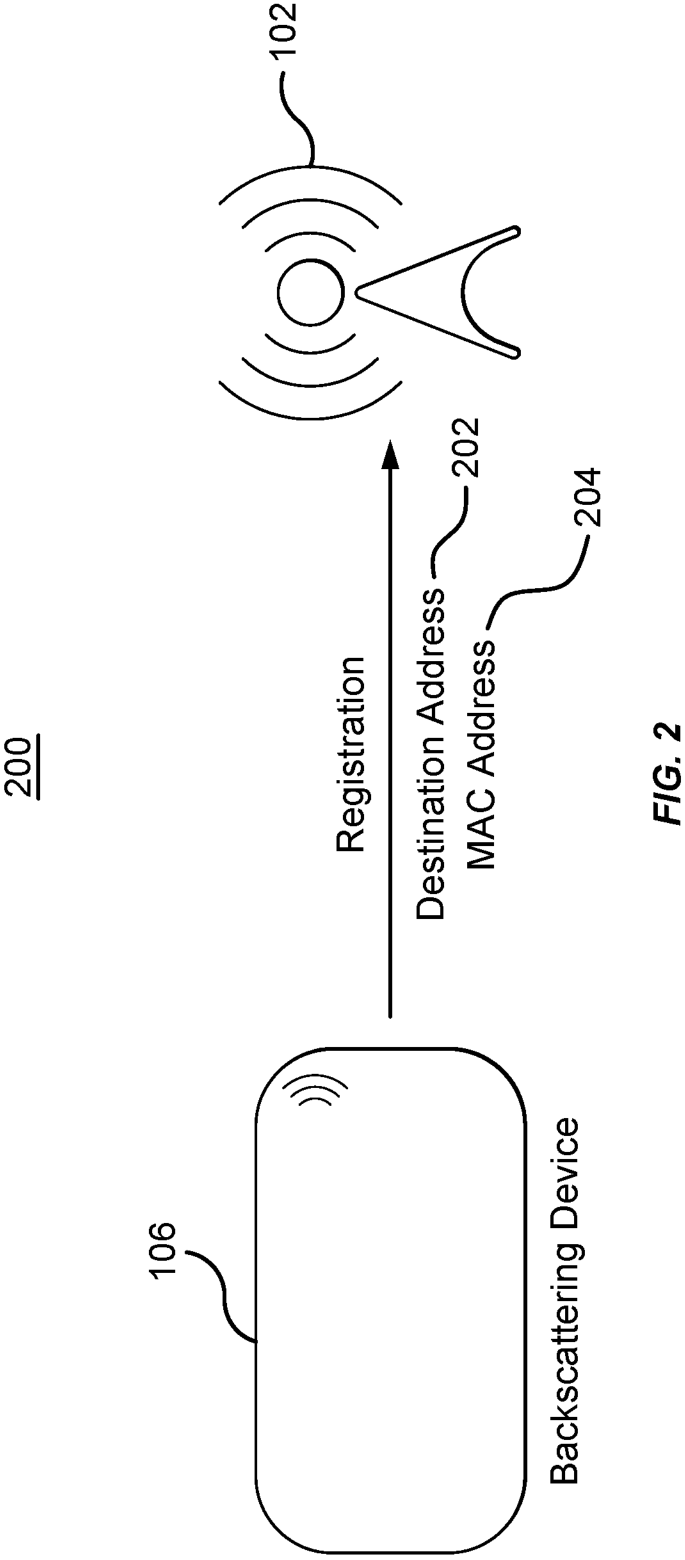
FIG. 2 illustrates an example operation performed by the system of FIG. 1A.

FIG. 2 illustrates an example operation 200 performed by the system 100 of FIG. 1A. Generally, the access point 102 and the backscattering device 106 perform the operation 200. By performing the operation 200, the backscattering device 106 registers with the access point 102.

When the backscattering device 106 connects to the access point 102, the backscattering device 106 may perform a registration operation with the access point 102. During registration, the backscattering device 106 may provide the access point 102 information about the backscattering device 106. The access point 102 may provide energizing frames that the backscattering device 106 may use to perform registration. In the example of FIG. 2, the backscattering device 106 provides the access point 102 a destination address 202 and a MAC address 204 during registration. The destination address 202 may be an address (e.g., an IP address) of a communication destination (e.g., a destination device or server) for messages communicated from the backscattering device 106. For example, if the backscattering device 106 is a sensor, then the destination address 202 may be the IP address of a server that uses the sensed information from the backscattering device 106. Generally, the destination address 202 for the backscattering device 106 is not expected to change. The MAC address 204 may be assigned to the backscattering device 106 when the backscattering device 106 is manufactured. The MAC address 204 may serve as an identifier for the backscattering device 106. After the backscattering device 106 registers with the access point 102, the backscattering device 106 may be allowed to communicate with and through the access point 102.

The backscattering device 106 may provide other information to the access point 102 during registration. For example, the backscattering device 106 may inform the access point 102 of the functions or operations of the backscattering device 106. The backscattering device 106 may also inform the access point 102 of the location of the backscattering device 106. From this information, the access point 102 may understand the functions or operations of the backscattering device 106 and how the access point 102 can support those functions or operations.

Figure 3:
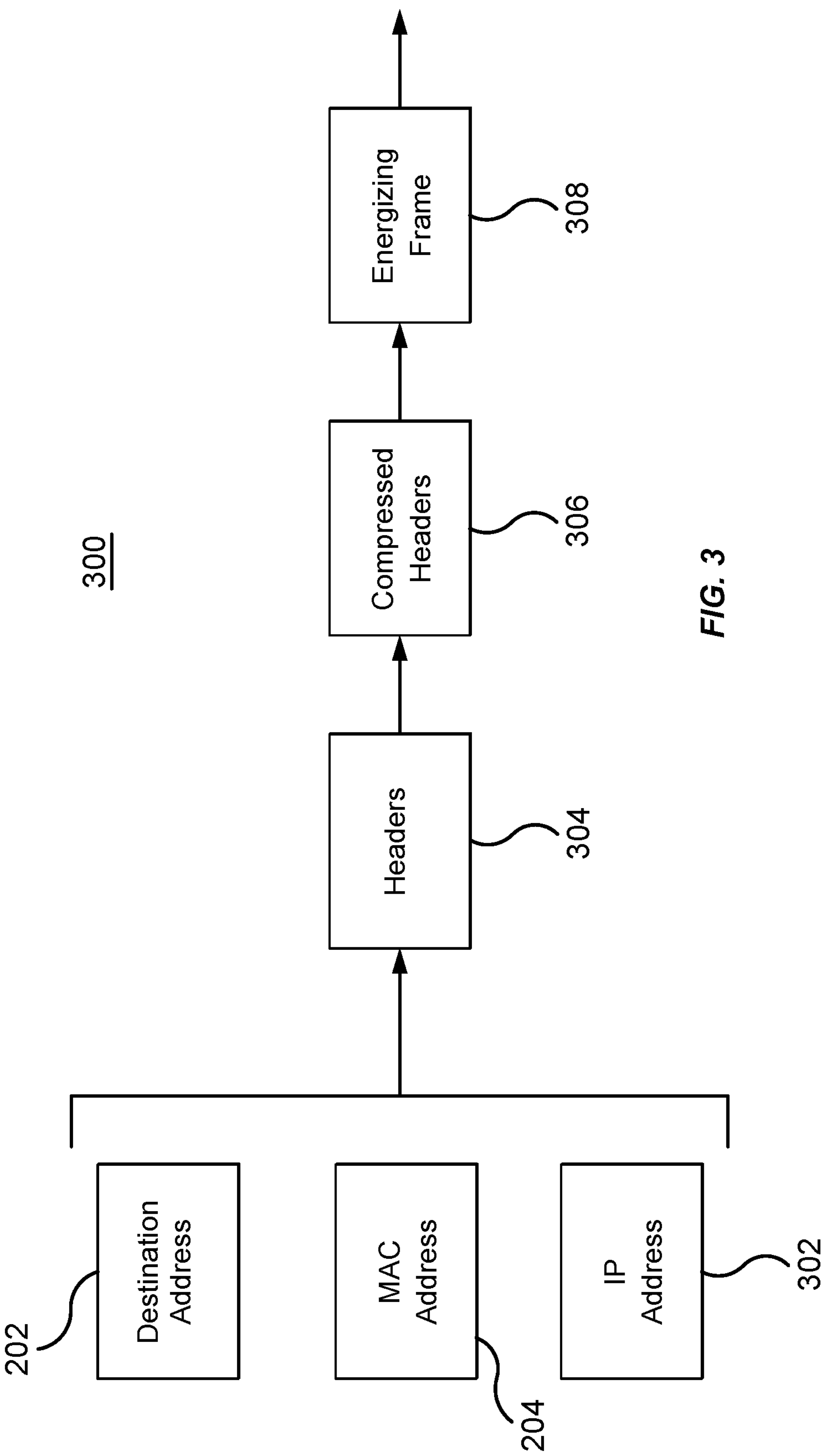
FIG. 3 illustrates an example operation performed by the system of FIG. 1A.

FIG. 3 illustrates an example operation 300 performed by the system 100 of FIG. 1A. Generally, the access point 102 performs the operation 300. By performing the operation 300, the access point 102 generates and communicates headers to the backscattering device 106.

The access point 102 receives the destination address 202 and the MAC address 204 of the backscattering device 106. For example, the backscattering device 106 may have provided the destination address 202 and the MAC address 204 during registration. The access point 102 also determines an IP address 302 for the backscattering device 106. In some embodiments, the access point 102 generates the IP address 302 for the backscattering device 106. In certain embodiments, the access point 102 contacts a DHCP server that generates and assigns the IP address 302 for the backscattering device 106. The DHCP server then communicates the IP address 302 to the access point 102.

The access point 102 uses the destination address 202, MAC address 204, IP address 302, and other information to generate one or more headers 304. The headers 304 may be IP headers that the backscattering device 106 can use to generate or form messages. The headers 304 may include headers for any layers of the network stack. For example, the headers 304 may include layer 2 (L2) headers and/or layer 3 (L3) headers. The headers 304 may include the destination address 202, the MAC address 204, and the IP address 302.

The access point 102 may compress at least a portion of the headers 304 to produce compressed headers 306. For example, the access point 102 may compress the portion of the headers 304 that includes the MAC address 204 of the backscattering device 106. By compressing the headers 304 or the portion of the headers 304, the access point 102 reduces the size of the headers 304. By reducing the size of the headers 304, the access point 102 may make it easier to include the compressed headers 306 into an energizing frame 308. The access point 102 may also include uncompressed portions of the headers 304 into the energizing frame 308. After the access point 102 includes the compressed headers 306 in the energizing frame 308, the access point 102 may communicate the energizing frame 308 to the backscattering device 106. When the backscattering device receives the energizing frame 308, the backscattering device 106 may use the information in the compressed headers 306 and/or the headers 304 to generate messages.

Figure 4:
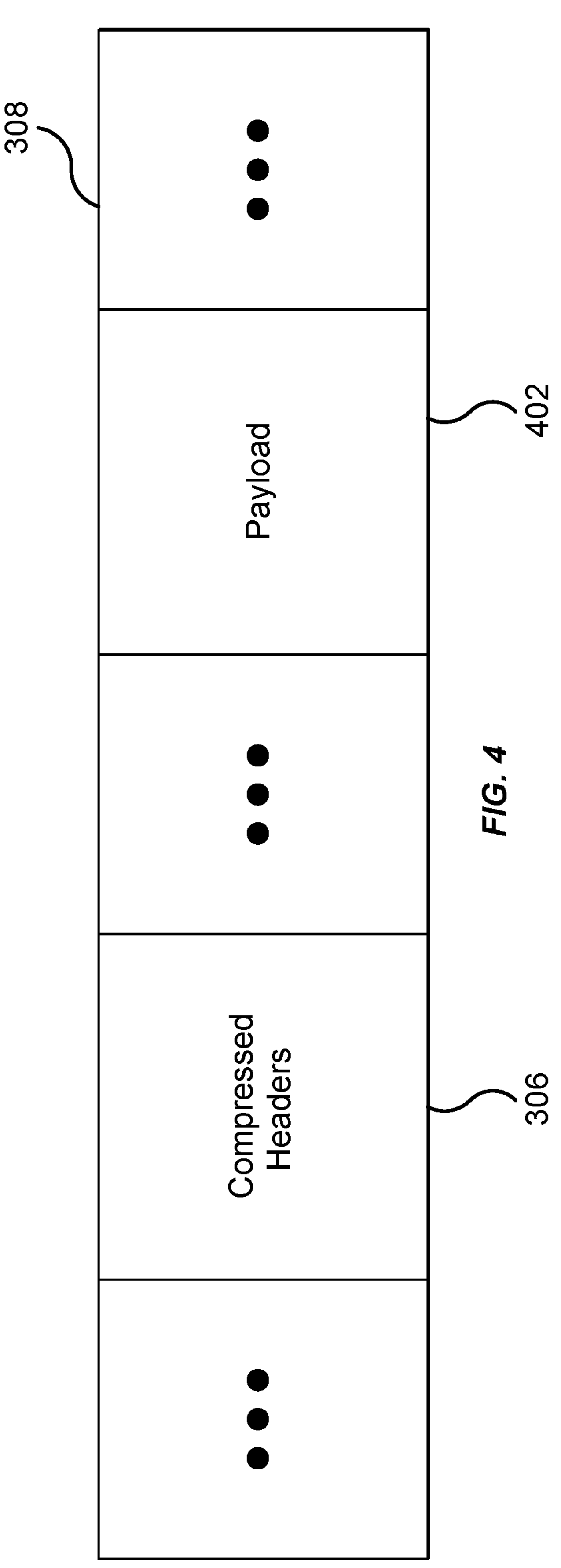
FIG. 4 illustrates an example energizing frame in the system of FIG. 1A.

FIG. 4 illustrates an example energizing frame 308 in the system 100 of FIG. 1A. The access point 102 sends the energizing frame 308 to the backscattering device 106 to provide energy for the backscattering device 106. Additionally, the access point 102 provides in the energizing frame 308 headers that the backscattering device 106 can use. As seen in FIG. 4, the energizing frame 308 includes the compressed headers 306 and a payload 402. The compressed headers 306 include compressed version of the headers 304 generated by the access point 102 for the backscattering device 106. The headers 304 may include information that the backscattering device 106 may include in IP headers for messages generated by the backscattering device 106. For example, the headers 304 may include the destination address 202 of the backscattering device 106, the MAC address 204 of the backscattering device 106, and/or the IP address 302 of the backscattering device 106. In some embodiments, the energizing frame 308 includes the headers 304 rather than or in addition to the compressed headers 306.

The headers 304 may include any networking information. For example, the headers 304 may include a frame check sequence, an identifier for the network (network ID), IP address of the backscattering device 106, MAC address for the backscattering device 106, and/or destination address.

The payload 402 may include data that the backscattering device 106 may modulate to form messages. The backscattering device 106 may use the information in the compressed headers 306 and the modulated payload 402 to form and reflect messages to the access point 102. In some instances, the payload 402 includes energy that the backscattering device 106 harvests. The backscattering device 106 then uses the harvested energy to generate messages using information in the compressed headers 306.

Thus, by providing the energizing frame 308 to the backscattering device 106, the access point 102 communicates the headers 304 that the backscattering device 106 may use when generating messages. As a result the backscattering device 106 avoids having to determine the information for the headers 304 and having to generate the headers 304, which conserves energy. For example, the backscattering device 106 may also avoid performing a DHCP process to be assigned an IP address.

Figure 5:
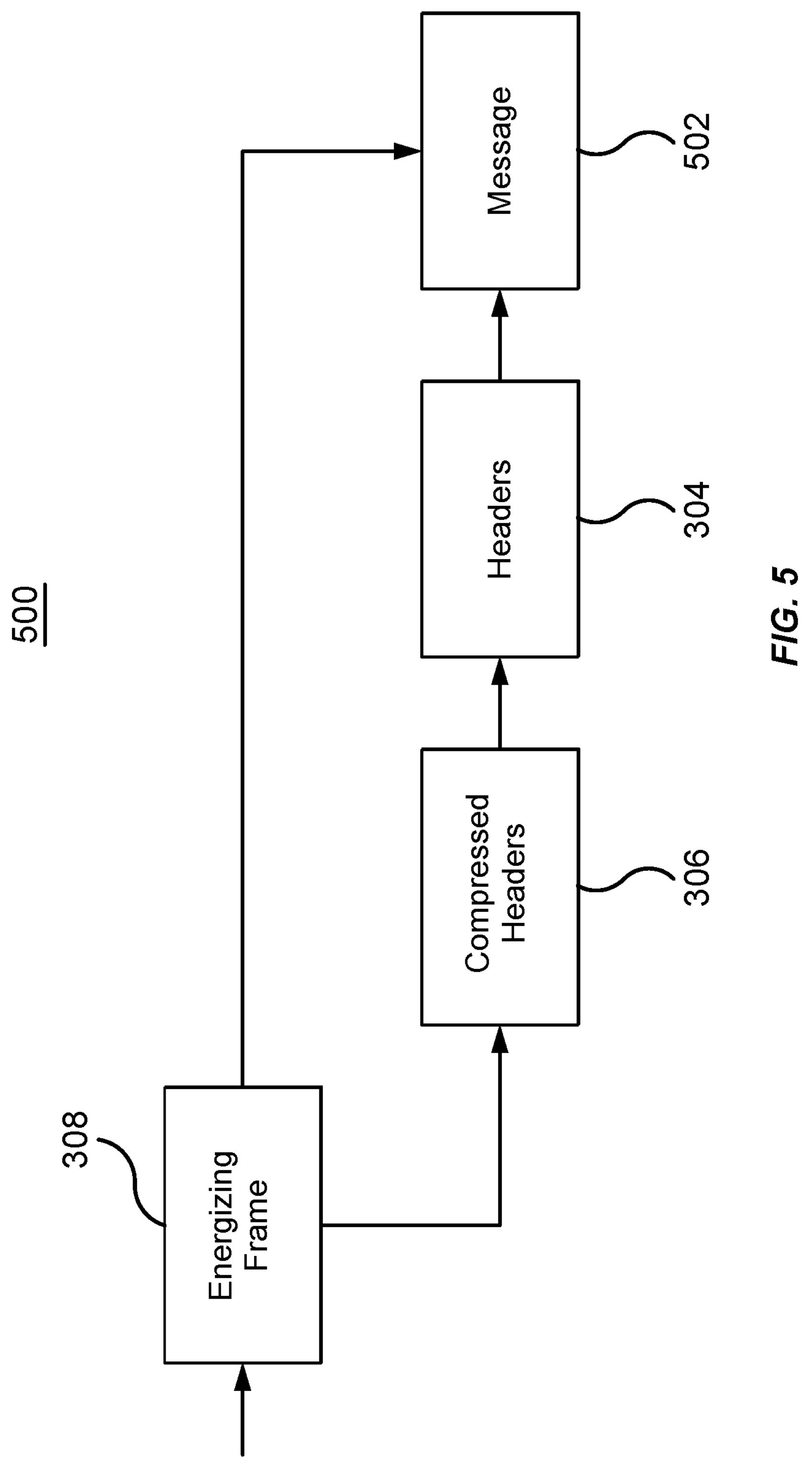
FIG. 5 illustrates an example operation performed by the system of FIG. 1A.

FIG. 5 illustrates an example operation 500 performed by the system 100 of FIG. 1A. Generally, the backscattering device 106 performs the operation 500. By performing the operation 500, the backscattering device 106 generates messages using information in the energizing frame 308.

The backscattering device 106 receives the energizing frame 308 from the access point 102. The backscattering device 106 then extracts the compressed headers 306 from the energizing frame 308. The backscattering device 106 may decompress the compressed headers 306 to extract the headers 304. In some embodiments, the energizing frame 308 includes the headers 304, and the backscattering device 106 may not need to perform decompression to extract the headers 304 from the energizing frame 308. The headers 304 may include information that the backscattering device 106 includes in headers for messages generated by the backscattering device 106 (e.g., the destination address 202, the MAC address 204, and/or the IP address 302).

The backscattering device 106 may generate a message 502 using the energizing frame 308 and the headers 304. For example, the backscattering device 106 may modulate the payload 402 in the energizing frame 308 to form the message 502. Additionally or alternatively, the backscattering device 106 may harvest energy from the energizing frame 308 and use that energy to generate the message 502. The backscattering device 106 also includes one or more of the headers 304 in the message 502. The backscattering device 106 may not change the headers 304 when including the headers 304 in the message 502, because the access point 102 may have formed the headers 304 as if the backscattering device 106 generated the headers 304. As a result, the backscattering device 106 may add the headers 304 to the message 502 and communicate the message 502. In this manner, the backscattering device 106 avoids expending energy determining and generating the headers 304. In some embodiments, the backscattering device 106 compresses portions of the headers 304 and includes these compressed portions into the message 502.

Figure 6:
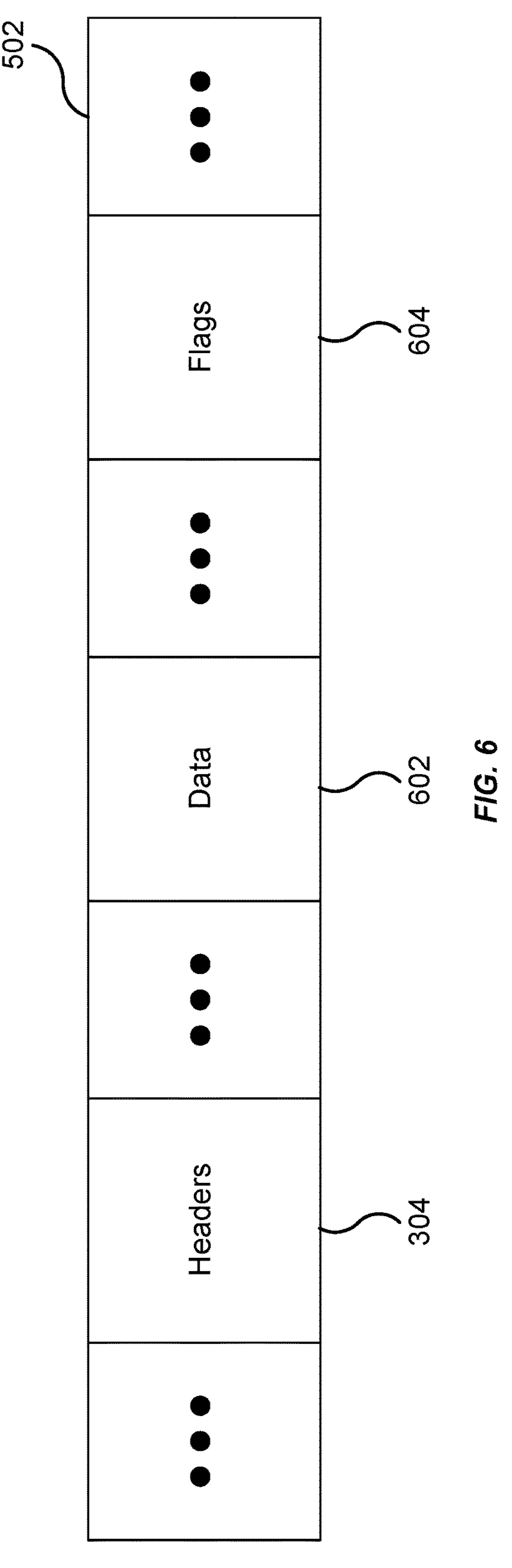
FIG. 6 illustrates an example message in the system of FIG. 1A.

FIG. 6 illustrates an example message 502 in the system 100 of FIG. 1A. Generally, the backscattering device 106 generates the message 502. As seen in FIG. 6, the message 502 includes the headers 304, data 602, and flags 604. The headers 304 may include any number of headers. For example, the headers 304 may include headers for various layers of the network stack (e.g., L2 headers and L3 headers). The headers 304 may indicate information that is used to route the message 502. For example, the headers 304 may indicate the destination address 202 for the message 502, the MAC address 204 for the backscattering device 106, and/or the IP address 302 for the backscattering device 106. The access point 102 and other network devices may use the information in the headers 304 to route the message 502.

The data 602 may include information that the backscattering device 106 wishes to communicate to other devices. For example, the data 602 may include information sensed by the backscattering device 106. The backscattering device 106 may have generated the data 602 by modulating the payload 402 of the energizing frame 308. Additionally or alternatively, the backscattering device 106 may have harvested energy from the energizing frame 308 and used that energy to generate the data 602.

The backscattering device 106 may set one or more of the flags 604 to indicate a status to the access point 102. For example, the backscattering device 106 may set the flags 604 to indicate that the backscattering device 106 has more data 602 to transmit to the access point 102. Setting this flag 604 may indicate to the access point 102 that the energizing frame 308 did not include enough energy or that the energizing frame 308 was not long enough for the backscattering device 106 to fully generate the data 602. When the access point 102 determines that the flag 604 is set, the access point 102 may make adjustments. For example, the access point 102 may send another energizing frame to the backscattering device 106 so that the backscattering device 106 may complete generating and communicating the data 602. The access point 102 may also adjust the length of subsequent energizing frames sent to the backscattering device 106 so that the backscattering device 106 may fully generate and communicate data using the subsequent energizing frames.

Figure 7:
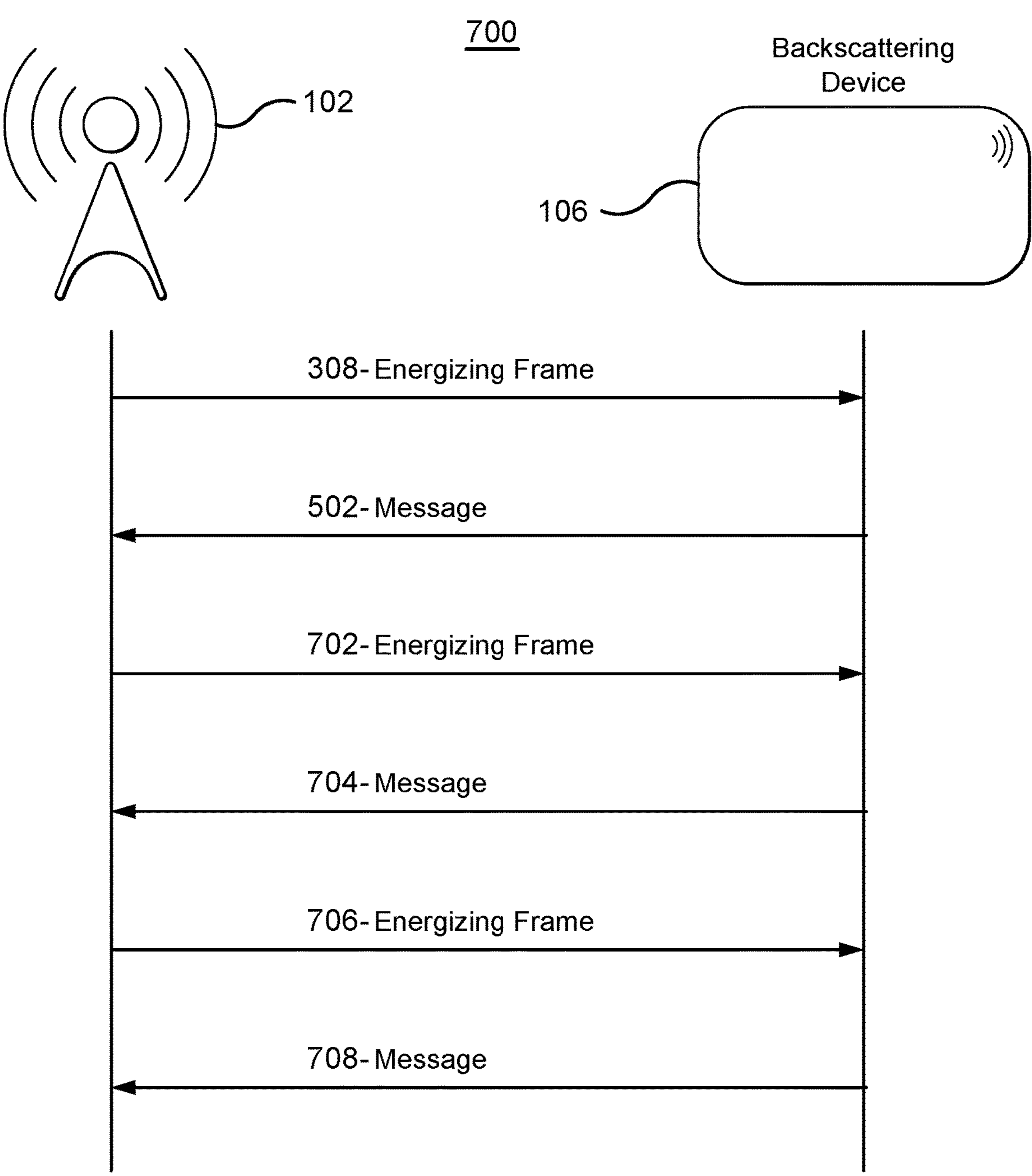
FIG. 7 illustrates an example operation performed by the system of FIG. 1A.

FIG. 7 illustrates an example operation 700 performed by the system 100 of FIG. 1A. Generally, the access point 102 and the backscattering device 106 perform the operation 700. By performing the operation 700, the access point 102 adjusts energizing frames according to the needs of the backscattering device 106.

The access point 102 begins by communicating the energizing frame 308 to the backscattering device 106. As discussed previously, the energizing frame 308 may include the headers 304 or the compressed headers 306 that the backscattering device 106 may use to generate messages. The energizing frame 308 may also include energy or the payload 402 that the backscattering device 106 may use to generate messages.

The backscattering device 106 generates the message 502 using the energizing frame 308. For example, the backscattering device 106 may modulate the payload 402 to form the message 502. Additionally, the backscattering device 106 may include the headers 304 from the energizing frame 308 in the message 502. The backscattering device 106 communicates the message 502 to the access point 102. The backscattering device 106 may also indicate, using a flag 604 in the message 502, that the backscattering device 106 has additional data to send to the access point 102.

When the access point 102 receives the message 502, the access point 102 may route the message 502 according to the information in the headers 304 in the message 502. The access point 102 may also detect that the flag 604 in the message 502 is set. The access point 102 may then determine that the backscattering device 106 has additional data 602 to send. In response, the access point 102 communicates an energizing frame 702 to the backscattering device 106. The energizing frame 702 may not include the headers 304 or compressed headers 306 that were included in the energizing frame 308. The energizing frame 702 may provide additional energy or include additional payload that the backscattering device 106 may use to complete sending the data 602.

The backscattering device 106 receives the energizing frame 702 and uses the energy or the payload in the energizing frame 702 to generate the message 704. The message 704 may include the remaining data that the backscattering device 106 did not communicate using the message 502. Additionally, the backscattering device 106 may add or include the headers 304 from the energizing frame 308 in the message 704. The backscattering device 106 then communicates the message 704 to the access point 102 to complete sending the data 602.

The access point 102 may adjust the lengths of subsequent energizing frames to the backscattering device 106 in response to the backscattering device 106 setting the flag 604 in the message 502. By increasing the length of subsequent energizing frames, the access point 102 may allow the backscattering device 106 to fully send the data using one energizing frame. In the example of FIG. 7, the access point 102 communicates the energizing frame 706 to the backscattering device 106. The energizing frame 706 may be longer than the energizing frames 308 and 702. For example, the energizing frame 706 may include more energy or may include a larger payload. The backscattering device 106 may use the energy or the payload in the energizing frame 706 to generate a message 708. The message 708 may include the headers 304 from the energizing frame 308. The backscattering device 106 then communicates the message 708 to the access point 102. The message 708 may include more data than the messages 502 and 704 due to the increased length of the energizing frame 706. Additionally, the backscattering device 106 may not need to set the flag 604 in the message 708, because no data remains to be sent. In this manner, the access point 102 adjusts the length of the energizing frames to the backscattering device 106 to accommodate the amount of data that the backscattering device 106 sends.

Figure 8:
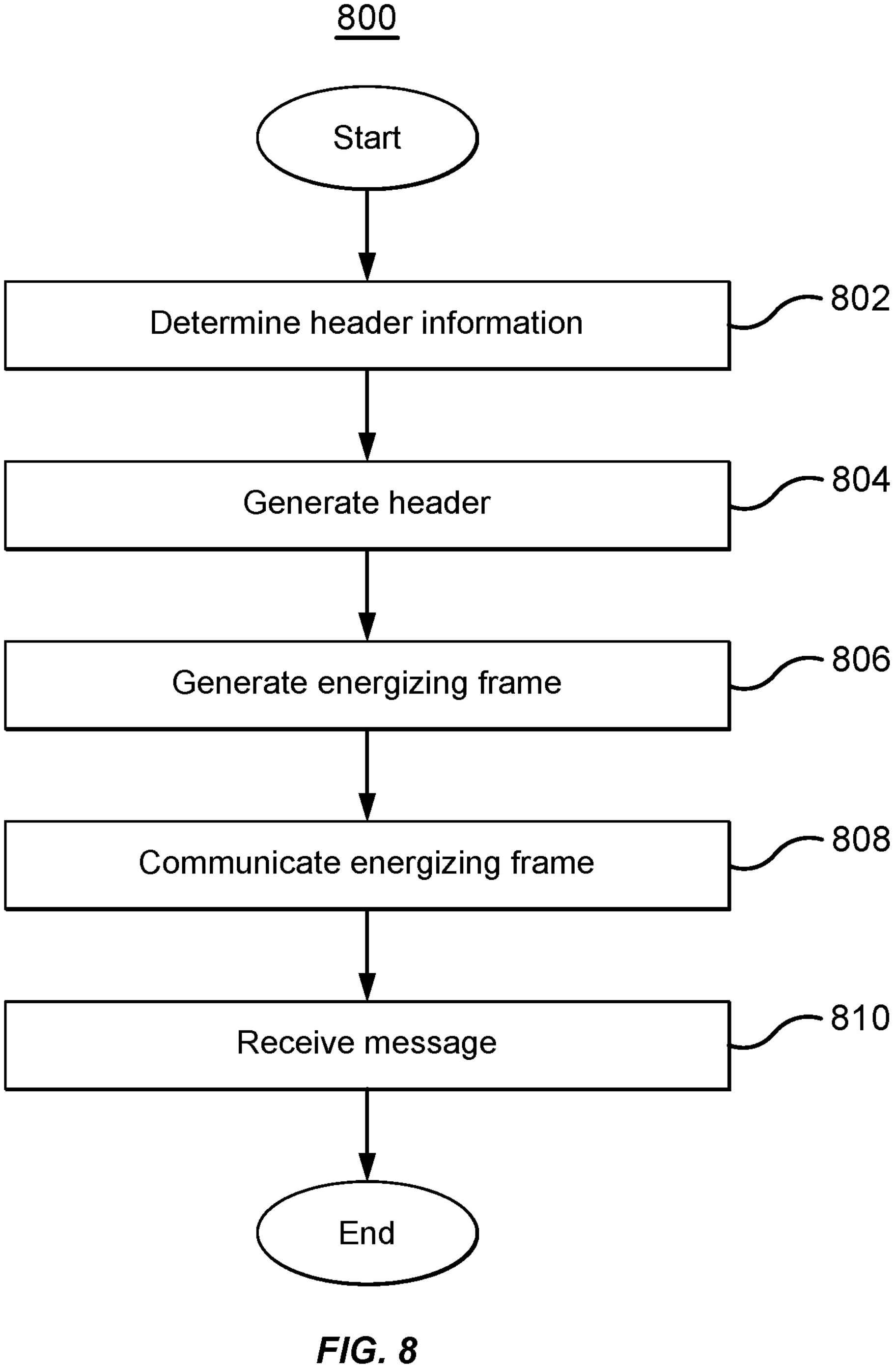
FIG. 8 is a flowchart of an example method performed in the system of FIG. 1A.

FIG. 8 is a flowchart of an example method 800 performed by the system 100 of FIG. 1A. In particular embodiments, the access point 102 performs the method 800. By performing the method 800, the access point 102 generates headers 304 for the backscattering device 106.

In block 802, the access point 102 determines header information. For example, the access point 102 may determine the destination address 202 and the MAC address 204 of the backscattering device 106. The backscattering device 106 may provide this information to the access point 102 during registration. The access point 102 may also determine the IP address 302 for the backscattering device 106. For example, the access point 102 may generate the IP address 302, or the access point 102 may use a DHCP server to generate and assign the IP address 302 to the backscattering device 106.

In block 804, the access point 102 generates the header 304. The header 304 may include the header information that the access point 102 determined for the backscattering device 106 in block 802. In this manner, the access point 102 generates an IP header that the backscattering device 106 may use to generate and communicate messages.

In block 806, the access point 102 generates the energizing frame 308. The energizing frame 308 may include the payload 402 that the backscattering device 106 uses to generate messages. The access point 102 also includes the header 304 in the energizing frame 308. In some embodiments, the access point 102 compresses the headers 304 to produce the compressed headers 306. The access point 102 then includes the compressed headers 306 in the energizing frame 308.

In block 808, the access point 102 communicates the energizing frame 308 to the backscattering device 106. The backscattering device 106 may then use the information in the energizing frame 308 to generate the message 502. The backscattering device 106 may include the headers 304 from the energizing frame 308 in the message 502.

In block 810, the access point 102 receives the message 502 from the backscattering device 106. The access point 102 may use the information in the headers 304 in the message 502 to route the message 502. As a result, the access point 102 assists the backscattering device 106 by generating and providing the headers 304 that the backscattering device 106 uses to generate the message 502. As a result, the backscattering device 106 avoids having to perform operations to determine and generate the headers 304, which conserves energy.

In summary, the access point 102 (or network controller) may determine header information (e.g., IP address, MAC address, destination IP address, etc.) for the backscattering device 106 (e.g., during registration). The access point 102 then generates a header using this information and includes the header in an energizing frame to the backscattering device 106. When the backscattering device 106 receives the energizing frame, the backscattering device 106 stores the header from the access point 102. When the backscattering device 106 forms and communicates a message, the backscattering device 106 uses the header from the access point 102 as the header or part of the header of the message.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:

one or more memories; and one or more processors communicatively coupled to the one or more memories, a combination of the one or more processors configured to:

determine an Internet protocol (IP) address for a backscattering device;

generate a header comprising the IP address;

communicate a first energizing frame to the backscattering device, wherein the first energizing frame comprises the header;

receive a message from the backscattering device, wherein the message comprises the header; and in response to a flag in the message being set, communicate a second energizing frame to the backscattering device, wherein a length of the second energizing frame is longer than a length of the first energizing frame.

2. The apparatus of claim 1, wherein the combination of the one or more processors is further configured to determine a media access control (MAC) address for the backscattering device and wherein the header further comprises the MAC address.

3. The apparatus of claim 1, wherein the combination of the one or more processors is further configured to compress a portion of the header to generate a compressed portion and wherein the header comprises the compressed portion.

4. The apparatus of claim 3, wherein the portion comprises a media access control (MAC) address for the backscattering device.

5. The apparatus of claim 1, wherein the combination of the one or more processors is further configured to determine an Internet protocol (IP) address for a communication destination of the backscattering device and wherein the header further comprises the IP address for the communication destination.

6. A method comprising:

determining, by an access point, an Internet protocol (IP) address for a backscattering device;

generating, by the access point, a header comprising the IP address;

communicating, by the access point, a first energizing frame to the backscattering device, wherein the first energizing frame comprises the header;

receiving, by the access point, a message from the backscattering device, wherein the message comprises the header; and in response to a flag in the message being set, communicating a second energizing frame to the backscattering device, wherein a length of the second energizing frame is longer than a length of the first energizing frame.

7. The method of claim 6, further comprising determining, by the access point, a media access control (MAC) address for the backscattering device, wherein the header further comprises the MAC address.

8. The method of claim 6, further comprising compressing, by the access point, a portion of the header to generate a compressed portion, wherein the header comprises the compressed portion.

9. The method of claim 8, wherein the portion comprises a media access control (MAC) address for the backscattering device.

10. The method of claim 6, further comprising determining, by the access point, an Internet protocol (IP) address for a communication destination of the backscattering device, wherein the header further comprises the IP address for the communication destination.

11. A non-transitory computer readable medium storing instructions that, when executed by a combination of one or more processors, cause the combination of one or more processors to:

determine an Internet protocol (IP) header that a backscattering device would use to communicate messages;

generate the IP header;

communicate a first energizing frame to the backscattering device, wherein the first energizing frame comprises the IP header;

receive a message from the backscattering device, wherein the message comprises the IP header; and in response to a flag in the message being set, communicate a second energizing frame to the backscattering device, wherein a length of the second energizing frame is longer than a length of the first energizing frame.

12. The medium of claim 11, wherein the instructions further cause the combination of the one or more processors to compress a portion of the Internet protocol (IP) header to generate a compressed portion and wherein the IP header comprises the compressed portion.

13. The medium of claim 12, wherein the portion comprises a media access control (MAC) address for the backscattering device.

14. The medium of claim 12, wherein the instructions further cause the combination of the one or more processors to determine an Internet protocol (IP) address for a communication destination of the backscattering device and wherein the IP header comprises the IP address for the communication destination.

* * * * *